H. HESS & G. M. HENRIE.
CAGE FOR BALL BEARINGS.
APPLICATION FILED JULY 28, 1911.
1,145,019.
Patented July 6, 1915.
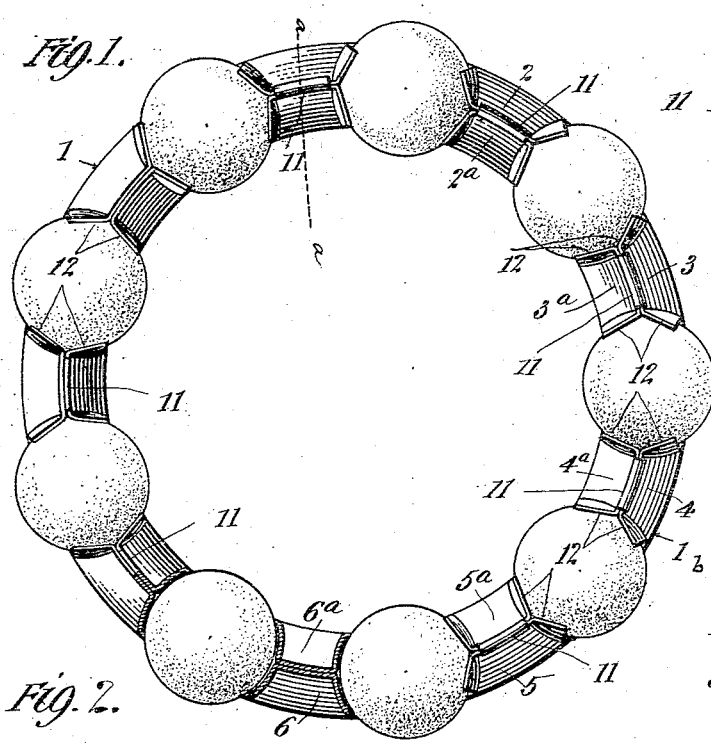
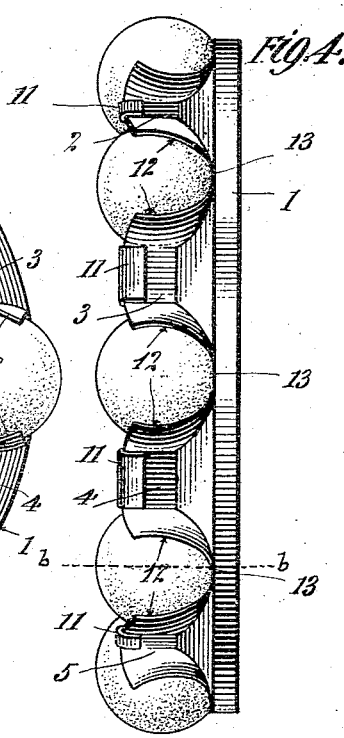
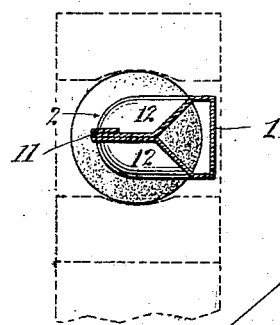
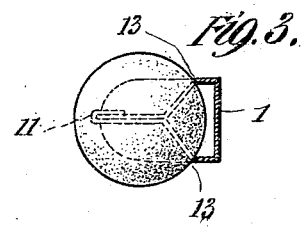
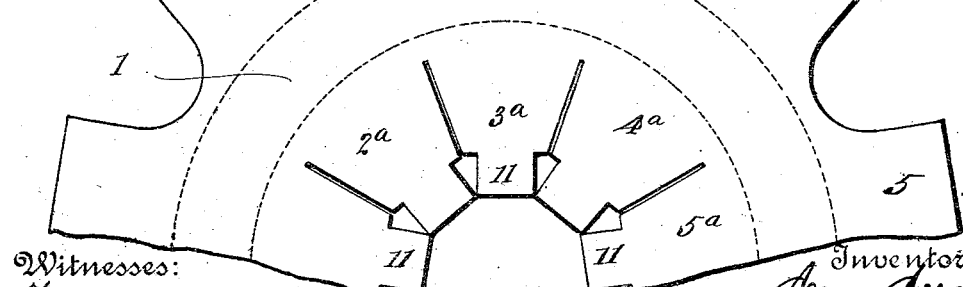

UNITED STATES PATENT OFFICE.

HENRY HESS AND GEORGE M. HENRIE, OF PHILADELPHIA, PENNSYLVANIA, ASSIGNORS TO THE HESS-BRIGHT MANUFACTURING COMPANY, OF PHILADELPHIA, PENNSYLVANIA, A CORPORATION OF DELAWARE.

CAGE FOR BALL-BEARINGS.

1,145,019.

Specification of Letters Patent.

Patented July 6, 1915.

Application filed July 28, 1911. Serial No. 641,038.

*To all whom it may concern:*

Be it known that we, HENRY HESS and GEORGE M. HENRIE, both citizens of the United States, and both residing at Philadelphia, in the county of Philadelphia and State of Pennsylvania, have invented certain new and useful Improvements in Cages for Ball-Bearings, of which the following is a specification, reference being had therein to the accompanying drawing.

This invention relates to ball holding cages for ball bearings, and has reference more particularly to that type of cage in which flaps or fingers are arranged between the balls so as to separate and form seats for them. In certain constructions of these cages, the flaps or fingers are attached by rivets or similar fastening means to a base ring, while in other forms the fingers or flaps are formed integrally with a base ring and are bent inwardly between the balls, their position between the balls being maintained by the inherent stiffness of the material. In the use of cages of these forms, when the parts to which the bearing containing the cages is applied, are driven at high rates of speed, the parts of the cage very frequently become separated and the flaps or fingers become displaced or distorted, whereby the efficiency of the cage is materially interfered with, if not entirely destroyed.

It is the aim of our invention to provide a cage free from such defects and capable of maintaining its form and effectiveness under the severe conditions encountered in practice, such for instance as high speeds, and the invention consists broadly in the provision of means for locking the fingers or flaps in their operative position between the balls, so that they will be firmly and fixedly held in proper effective position without liability of bending out and releasing the balls, or becoming detached, or of becoming deformed or displaced.

In its more specific embodiment, our improved cage is constructed from a single piece of sheet metal, and comprises a flat base or ring provided at intervals with pairs of opposing flaps or fingers constituting ball seats between the pairs of flaps, the flaps of each pair being bent inwardly toward each other and brought together between the balls, at which point they are locked or fastened together, preferably by interlocking one flap with the other.

Our invention is susceptible of different forms of embodiment, that form shown in the accompanying drawings being the one which we prefer to adopt. It will be understood, therefore, that our invention is not limited to the form or embodiment shown, nor to any particular form or construction of the parts except in so far as such limitations are specified in the claims.

In the accompanying drawings: Figure 1 is a plan view of our improved cage with some of the balls in place and others removed, parts of the cage being in section to better illustrate its construction. Fig. 2 is a cross section on the line *a—a* of Fig. 1. Fig. 3 is a similar view on the line *b—b* of Fig. 4. Fig. 4 is a side elevation of the cage with some of the balls removed. Fig. 5 is a plan view of the blank from which the cage is formed.

Referring to the drawings: Our improved cage is constructed from a single piece or blank of sheet metal, and consists of a ring or base 1 provided at intervals with pairs of opposing flaps or fingers 2—2$^a$, 3—3$^a$, 4—4$^a$, etc., the flaps of each pair extending inwardly respectively from the inner and outer edges of the base ring 1 toward each other and meeting at a point some distance beyond the base plate, from which point the two flaps extend flatly face to face in a direction axially of the ring, and are firmly and fixedly connected together, preferably by means of a lip 11 on one of the flaps, which is bent over and around the end of the companion flap, as shown in Fig. 3. It will be seen from this construction that the two flaps extending flatly face to face, form in effect a stiff strut between the balls, the effect of which is to strengthen the cage in a circumferential direction, and effectually prevent distortion of the parts from the wedging action of the balls or from other causes. Furthermore, it will be seen that the inwardly extending portions of the flaps in connection with the base ring, form throughout the extent of the cage, a series of inclosed spaces or chambers, which are adapted to hold a large quantity of lubricant, and in this way insure that the bearing will be maintained in proper lubricated condition for a long period of time.

The edges of the flaps, where the latter extend between the balls, are provided with flanges 12—12, which partially embrace the balls both in a direction radially of the cage and also axially of the same, the flanges on the flaps of adjacent pairs, constituting conjointly a curved seat for one ball, which ball has surface contact against the flanges, as well as contact against the inner portions 13 of the edges of the flaps of adjacent pairs, which edges are curved and so support the ball that it will be sustained free of contact with the base ring, as clearly shown in Fig. 3.

In Fig. 5 we have shown the outline form of a blank suitable for producing the cage illustrated in the other figures. This blank is of general circular form containing a ringlike portion which forms the base ring of the cage, and from which there are extended on opposite sides. the outer flaps 2, 3, 4, etc., and the inner flaps 2ª, 3ª, 4ª, etc., which flaps are so formed that when they are bent inwardly and brought together and flanged as described, ball seats will be afforded between the pairs of flaps in the manner set forth. In assembling the cage in the bearing, the balls are first assembled between the casing members of the bearing, and the cage, in finished condition with the exception of the bending over of the locking lip, is forced over the balls, and finally the lips of one of the flaps of the pairs are bent over the companion flaps to secure them firmly together.

By reason of the construction described, the cage may be made of very light material while possessing the necessary strength and stiffness; and by reason of the fact that the balls are embraced on opposite sides by the flanged flaps, a correct centering of the balls is brought about, and there is secured a proper balancing of masses on either side of the central plane through the balls, at right angles to the axis of the cage. Furthermore, by reason of the fact that the flaps of the pairs are interlocked with each other or fastened together, they will be effectually prevented from bending up or separating, or becoming distorted or deformed under the severe conditions encountered in practice, particularly when the parts to which the bearing containing the cage is applied, are driven at high speeds.

The cage being made from a single piece of metal, there is no liability of the separation of any of its parts.

Having thus described our invention, what we claim is:—

1. A cage for ball bearings, said cage comprising a radially extending ring or base, and pairs of flaps extending from the opposite edges of said base inwardly toward each other and forming ball inclosures between the pairs, the ends of the flaps of a pair being secured together between the balls.

2. A ball holding cage for ball bearings, said cage comprising a radially extending ring or base provided at intervals with pairs of opposing flaps extending from the opposite edges of the base inwardly toward each other and then flatly face to face in an axial direction and having their ends secured together.

3. A ball holding cage for ball bearings, said cage comprising a radially extending ring or base provided at opposite edges with pairs of flaps extending inwardly toward each other, one flap of a pair being bent over and around the end of its companion flap to secure them together.

4. A ball holding cage for ball bearings, said cage comprising a radially extending ring or base provided at its opposite edges with pairs of opposing flaps extending inwardly toward each other, with the flaps of a pair secured together, said flaps being provided with edge flanges to embrace the balls.

5. A ball holding cage for ball bearings, constructed from a single piece of sheet material and comprising a flat radially extending base or ring provided at intervals with pairs of inwardly extending flaps forming ball inclosures between the pairs, said flaps being brought together between the balls and spaced in an axial direction from the ring or base so as to form a chamber between the balls.

In testimony whereof we affix our signatures in presence of two witnesses.

HENRY HESS.
GEORGE M. HENRIE.

Witnesses:
W. L. BATT,
MARY M'CALLA.